A. SHEPARD.
Sausage Filler.

No. 28,414.

Patented May 22, 1860.

Witnesses:

Inventor:
Amos Shepard.

UNITED STATES PATENT OFFICE.

AMOS SHEPARD, OF SOUTHINGTON, CONNECTICUT.

SAUSAGE-FILLER.

Specification of Letters Patent No. 28,414, dated May 22, 1860.

*To all whom it may concern:*

Be it known that I, AMOS SHEPARD, of Southington, in the county of Hartford and State of Connecticut, have invented a new and useful Improvement in Machines for Filling Sausages; and I do hereby declare that the following is a full and exact description thereof, reference being had to the accompanying drawings, and to the letters of reference marked thereon, in which drawings—

Figure 1:
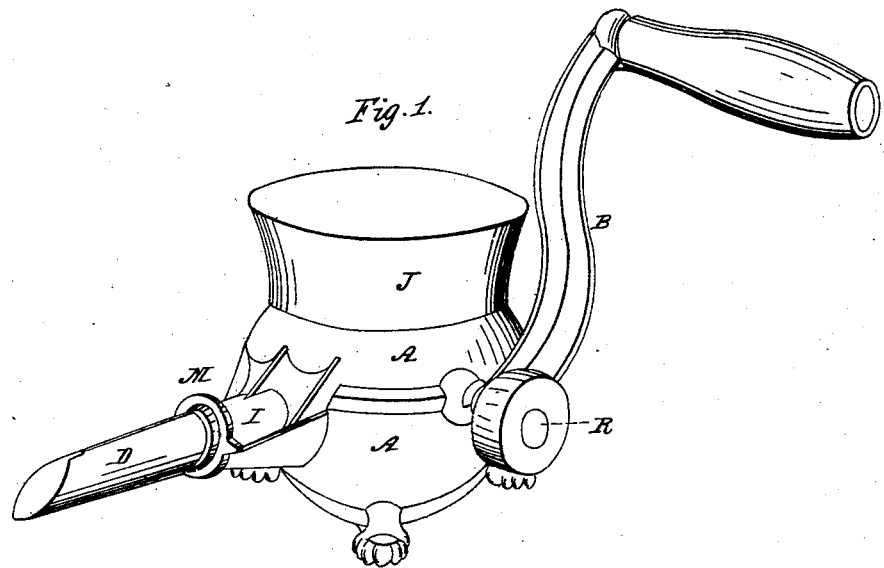
Figure 2:
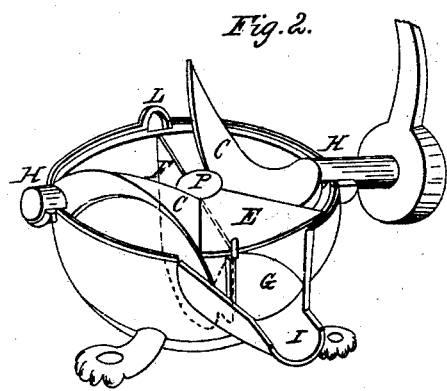
Figure 3:
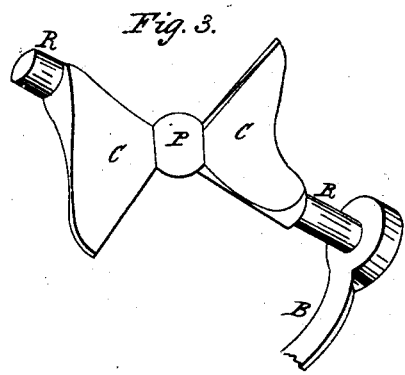

Figure 1 represents the machine put together ready for use. Fig. 2 shows the same machine with the top removed. Fig. 3 represents the shaft, with the cams or drivers.

The same letters refer to like parts in each of the figures.

My invention consists, first, in arranging a revolving cam which is a cone or section of a cone—on a shaft, in combination with a cut off—in such a manner that the face of the cam fits the cut-off, and drives the cut off in a circle, whose center is found in the axis of motion, of the shaft on which is the cam; and if two cams—reversed with respect to each other—are used (as in the drawings,) in giving to the cut off a reciprocating motion in a circle whose center is also found in the axis of motion of the shaft, at a point where the apices of the conical cams meet in said shaft. By this arrangement, the cut off, may be entirely contained in the case which holds the cams, thus obviating any use for a projecting guide for the cut off, and making a light compact and cheap machine.

Secondly, my invention consists in arranging a valve in the spout I, to prevent the meat from passing from one division of the globular shell into the other.

Thirdly, it consists in arranging the working parts in a globular shell, whereby are secured lightness and capacity.

To construct my improved sausage filler, make a hollow shell in the form of a globe A, A, on which construct a hopper J, to receive the meat. The globular shell parts in the middle, as is seen in Fig. 2, which shows the lower part. The two parts are held together by a hook on the upper shell which enters the eye L, Fig 2, and by a ring M, on the spout I.

I, is a spout projecting from the body of the shell or globe; in which spout is placed the tin tube D, which holds the case or bag that is to be filled.

F, is a partition, whose outline is shown by the red dotted lines, and which starting from the middle of the spout I, divides the shell into two equal and similar parts. The partition divides the shell at right angles with the axis of motion of the shaft.

R, is the shaft, on which is secured the driving crank B; and the cams C, C, are on the same shaft. These cams C, C, are parts of conical shells, having their apices in the point P, and are so arranged on the shaft R, as to give to the cut off E, a reciprocating circular motion between them.

H, H, are bearings which receive the journals of the shaft R.

E, is a cut off, resting on the partition F, and on a ledge or recess in the lower half of the shell A, and it is held in its place by and between the upper and lower parts of the shell A, A. The object of this cut off is to take the meat off the cams C, C, and direct it into the spout I.

It will be noticed that the cut off E, and either of the cams C, C, are so arranged that the cut off E, is made to move in a circle the center of which lies in the axis of motion of the shaft R, and the apex of either of the cams is found in the same center.

G, is a valve placed in the spout I, and fitted to meet the partition F, and free to turn on its pivot O. The object of this valve is to prevent the meat from passing around the partition F into the opposite half of the shell. In the model two cams are used, acting alternately, which gives a more rapidly working machine, but this is not necessary, as a good machine can be made with only one cam arranged to drive the cut off as herein described.

In case that only one cam is used the valve G will not be needed, and the cut-off E may be thrown back by any known means. To use my improved machine fill the hopper J, with minced meat, and turn the crank that is attached to the shaft, and the cams will press any meat that is before them into the lower part of the shell; where the meat will be confined by the cam—the shell—the partition and the cut off, and it will be seen that on farther motion being given to the crank, the meat thus confined will be forced into the tin tube D, and through the tube, into the case on said tube.

In use, the valve G, will turn to one side or the other of the spout I, according as the pressure of the cams is on one side or the other of the partition F.

Having described my invention, what I claim therein, and desire to secure by Letters Patent, is—

Arranging the cam or cams C, C, in combination with the cut off E, and the valve G, as and for the purposes described.

AMOS SHEPARD.

Witnesses:
 O. W. STOW,
 S. WALKLY, Jr.